ated May 16, 1961

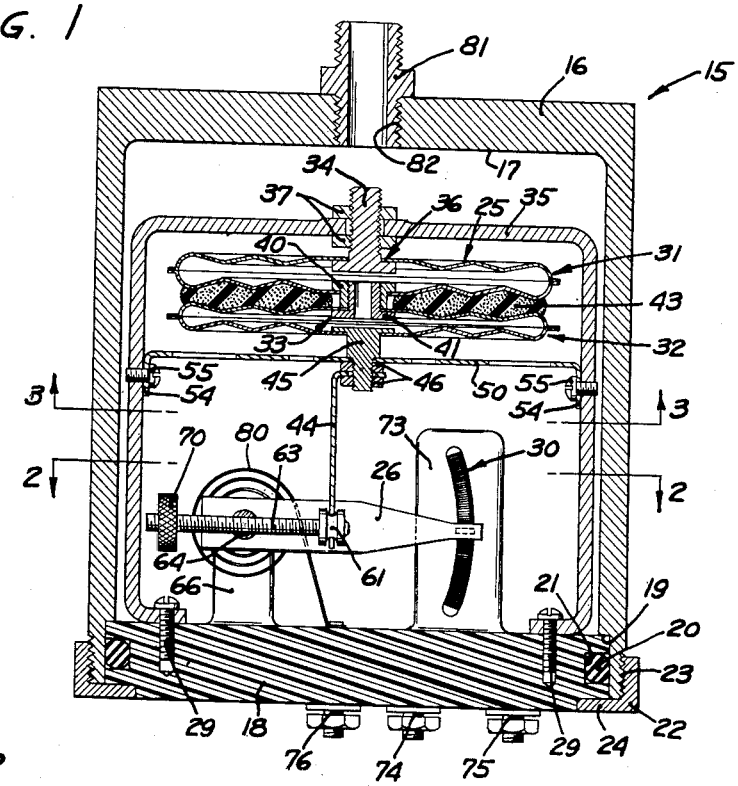
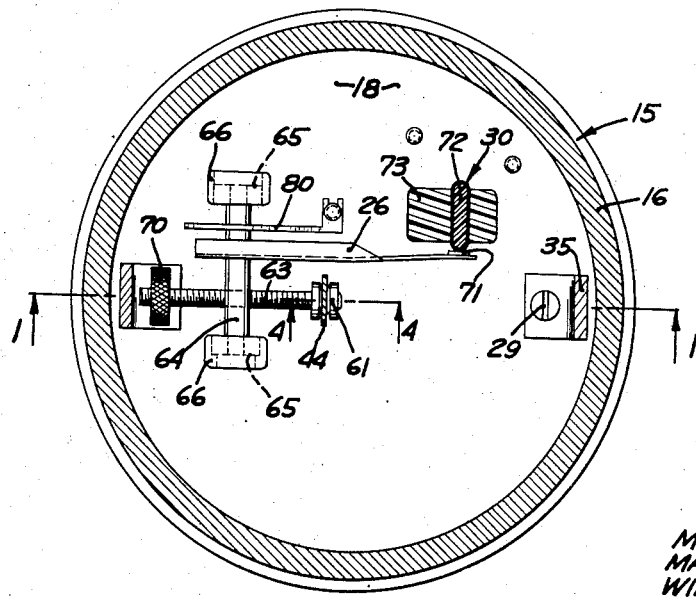

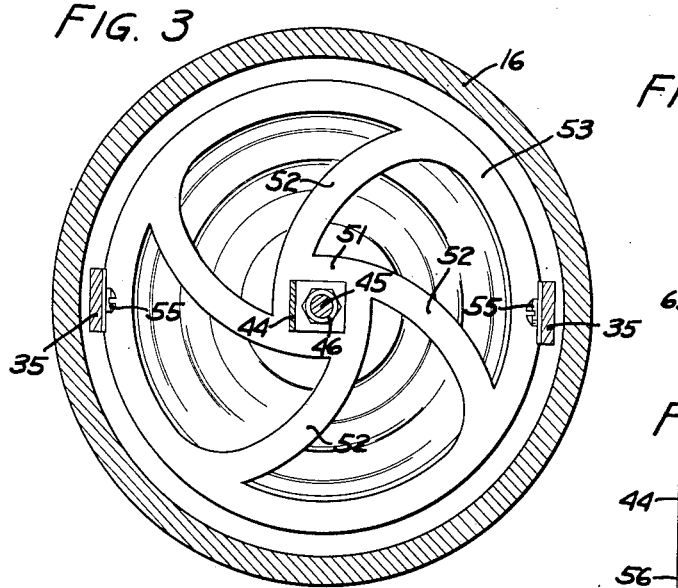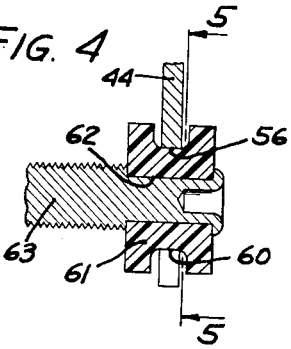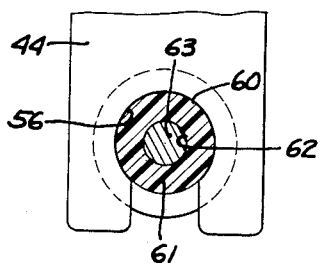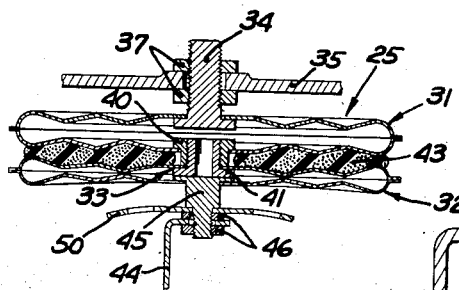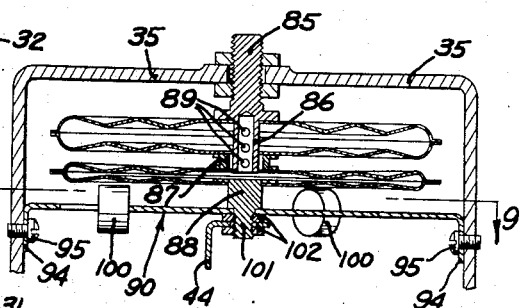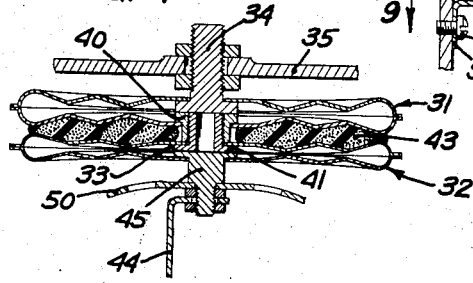

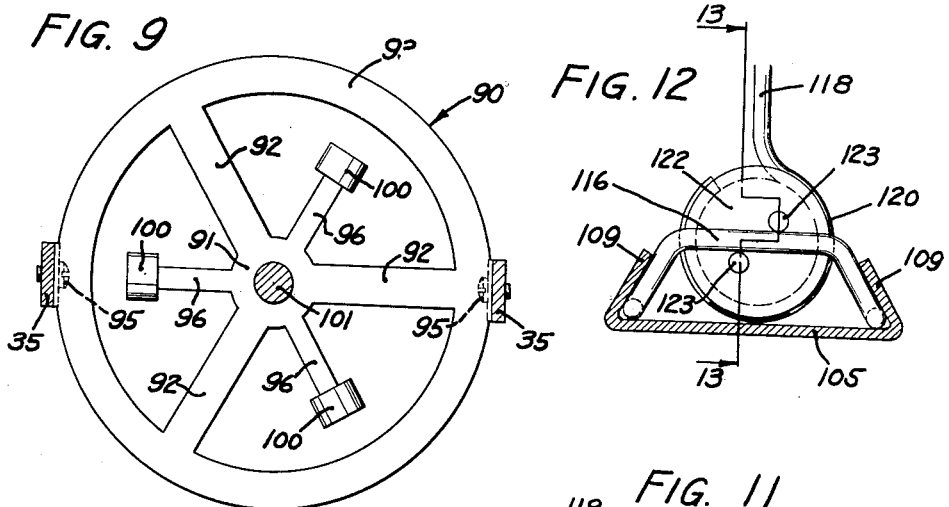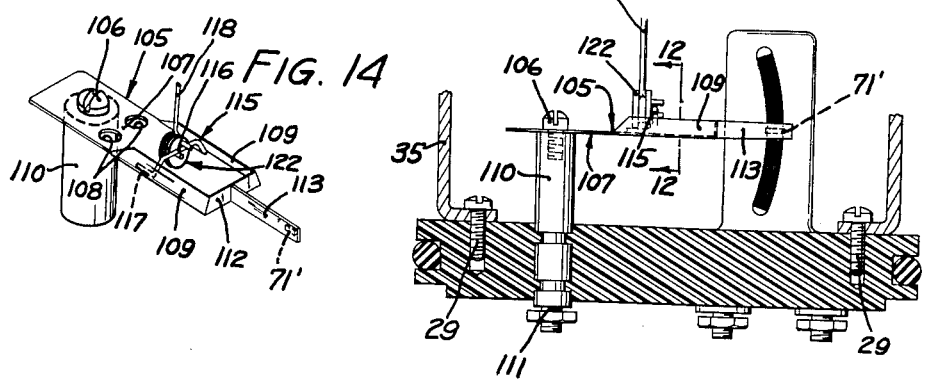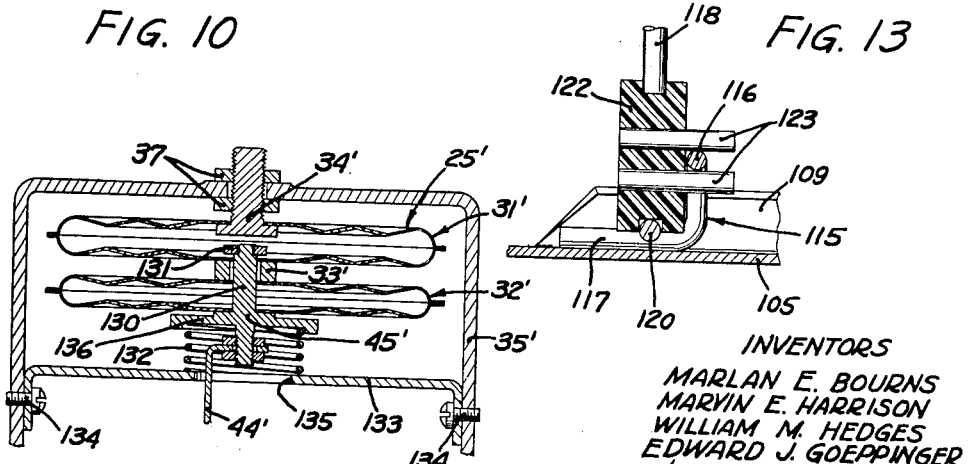

2,984,803

PRESSURE RESPONSIVE INSTRUMENT

Marlan E. Bourns, Marvin E. Harrison, William M. Hedges, and Edward J. Goeppinger, all of Riverside, Calif.; said Harrison, Hedges, and Goeppinger assignors to Marlan E. Bourns, Riverside, Calif.

Original application Nov. 30, 1953, Ser. No. 394,974, now Patent No. 2,857,495, dated Oct. 21, 1958. Divided and this application Oct. 2, 1958, Ser. No. 780,176

6 Claims. (Cl. 338—41)

The present invention relates to pressure responsive instruments, and more particularly to pressure potentiometers which produce voltage outputs that are a function of the pressure applied thereto.

This is a division of our co-pending application, Serial No. 394,974, filed November 30, 1953, now Patent No. 2,857,495, and entitled Pressure Responsive Instrument.

The primary object of the invention is to provide a new and improved pressure potentiometer embodying certain advantages and desirable features, which will be pointed out hereinafter.

One of the important objects of the invention is to provide a pressure potentiometer wherein the pressure sensitive element, contact member, resistance element, and all other functional parts are supported entirely from a lid which closes the cavity in the instrument housing. The chief advantages of this arrangement is that it makes possible the complete sub-assembly of all of the working components, including the bellows and electrical elements, into a complete unit which can be tested and adjusted, and then inserted into the housing to form the completed instrument. With the electrical elements and pressure sensitive elements mounted together on a common base, there are no problems of assembly misalignments, nor of complications caused by thermal expansion of the housing, and the like.

Another object of the invention is to provide a new and unique arrangement whereby a bellows unit can be made to respond to pressure changes over a predetermined range, with a non-linear response. Thus, for example, the bellows unit of the present invention can be made to give a relatively large deflection per increment of pressure up to a predetermined pressure level, and then a smaller deflection per increment of pressure for pressures above that level. This object is accomplished by providing a pressure sensitive unit of two bellows wafers, one of which is appreciably less resistant to compression than the other; together with a limit stop means to limit travel of the less resistant wafer at a predetermined pressure differential between the inside and outside of the bellows. By virtue of this arrangement, the two bellows wafers are compressed simultaneously at pressures below the predetermined level, giving a high deflection per increment of pressure; whereas, above that predetermined pressure level, the less resistant wafer is bottomed on its limit stop, and only the more resistant wafer remains operative, giving a lower deflection per increment of pressure.

Another object of the invention is to provide a new and unique internal arrangement for limiting the travel of a bellows unit; one form of which limits the overall travel of the bellows in two steps, whereas another form limits the bellows travel in one step.

A further object of the invention is to provide a pressure responsive instrument embodying a new and unique vibration absorbing arrangement, which functions to damp out vibration and flutter of the movable end of the bellows. This object is attained by means of a dynamic vibration absorber comprising a resilient member which is attached to the movable end of the bellows, the said member having arms projecting radially from the axis of the bellows, and weights attached to the outer ends of the arms, which form a spring-mass system. This spring-mass system is tuned to the major resonance frequency of the bellows assembly, and when a driving frequency equal to the resonant frequency of the bellows is applied, the arms with their attached weights do all the vibrating, while the bellows remains stationary.

Another object of the invention is to provide vibration damping in the wafer type of bellows by means of sponge rubber pads, which are interposed between wafers and bear against the adjacent surface thereof.

A further object of the invention is to provide a novel contact arm arrangement which provides an arcuate sweep of the contact over the resistance element, yet which has no pivots. This object is accomplished by employing a thin spring strip which is fixedly attached at one end to a suitable support, and has a contact at the other end thereof; the said spring strip having at least a portion of its length disposed in a plane perpendicular to the plane of movement of the contact. The spring strip thus bends in the flat portion adjacent the attached end, and the contact swings in an approximately arcuate path. By making the spring strip quite thin and flexible, the resistance to bending can be minimized, and is negligible for many installations.

Another object of the invention is to provide a novel arrangement for connecting the movable end of the bellows to a pivoted contact arm, whereby the length of the moment arm acted upon by the bellows force can be increased or decreased at will by a simple adjustment.

Another object is to provide a connection between the movable end of the bellows and a swinging contact arm, which can be adjusted to take up all clearances, thereby eliminating back-lash in the system.

A further object of the invention is to provide a novel arrangement for eliminating or modifying the spring constant of the bellows as a factor in its response. This is accomplished by means of a relatively stiff spring, which bears against the movable end of the bellows in the direction opposing its operating travel. The spring constant of the bellows is low compared to that of the spring itself, which results in low hysteresis, good linearity of response, and easy adjustment of the travel versus pressure characteristics.

Still another object of the invention is to provide a novel arrangement for stabilizing the movable end of the bellows against side sway, without appreciably affecting the extension and contraction of the bellows. This is accomplished by means of a diaphragm of thin sheet material that is attached at its edges to the bellows support. The diaphragm is located adjacent and parallel to the movable end of the bellows, and has a center portion that is attached to the edges by generally radial spokes. The center portion of the diaphragm is attached to the movable end of the bellows.

The foregoing and other objects and advantages of the present invention will become apparent to those skilled in the art upon consideration of the following detailed description of the preferred embodiment thereof, reference being had to the accompanying drawings wherein:

Figure 1 is a vertical section through an instrument embodying the principles of our invention, taken along the line 1—1 in Figure 2;

Figure 2 is a transverse section through the same taken at 2—2 in Figure 1;

Figure 3 is another transverse section through the same, taken at 3—3 in Figure 1;

Figure 4 is an enlarged fragmentary sectional view of a detail, taken at 4—4 in Figure 2;

Figure 5 is a transverse section of the same, taken at 5—5 in Figure 4;

Figure 6 is a fragmentary section through the bellows of Figure 1, showing the limit stop means of the bottom bellows wafer abutted together to limit further compression of the same;

Figure 7 is a view similar to Figure 6, showing the limit stop means of both the bottom and top wafers abutted together to limit compression of both wafers;

Figure 8 is a view of a modified form of the invention;

Figure 9 is a sectional view taken at 9—9 in Figure 8;

Figure 10 is a sectional view through another embodiment of the invention;

Figure 11 is a fragmentary sectional view of another form of contact arm and connecting linkage;

Figure 12 is an enlarged fragmentary sectional view taken at 12—12 in Figure 11;

Figure 13 is a sectional view taken at 13—13 in Figure 12; and

Figure 14 is a fragmentary perspective view of the contact arm assembly of Figure 11.

Referring first to Figures 1 to 7, inclusive, of the drawings, we have designated the instrument in its entirety by the reference numeral 15. The instrument shown is a pressure potentiometer of the type particularly designed for measuring absolute pressures, although the instrument may be modified to measure differential pressures by changes which will be readily understood by those skilled in the art. The instrument 15 comprises a generally cylindrical, metal housing 16, having a cavity 17 projecting inwardly from one end thereof. Mounted on the open end of the housing 16 and enclosing the cavity 17 is a lid 18 of non-conductive plastic material, such as one of the phenolic resins. The lid 18 is inserted into the end of the cavity 17 and is seated on an annular shoulder 19. An O ring 20 seated within a circumferential groove 21 in the edge of the lid 18, seals the clearances between the lid and housing. A ring 22 is screwed onto threads 23 on the outer surface of the housing, and inwardly projecting flange 24 of the ring overlies the marginal edges of the lid to hold the same down against the shoulder 19.

Mounted within the cavity of the housing is a pressure sensitive element 25, which is operatively connected to a contact arm 26 that wipes on a resistance element 30. The pressure sensitive element 25 may take other forms than that illustrated, but in the preferred form comprises two bellows wafers 31 and 32, which are formed of corrugated sheet metal and joined together at their centers by a bushing 33. The bellows unit 25 is attached at its top end by a screw 34 to an inverted, generally U shaped support 35, the ends of which are bent inwardly and secured by screws 29 to the plastic lid 18. The screw 34 is inserted through a central hole in the top side of the bellows 31 and is soldered at 36. Two locknuts 37 on the screw 34 secure the same to the support 35.

The center bushing 33 connecting the wafers 31, 32 together may take any desired form, but for convenience is shown as comprising two tubular threaded fittings 40, 41 which extend through holes in the adjacent faces of the wafers and are soldered thereto. The tubular stems of the fittings 40, 41 project outwardly from the wafers and are screwed together and soldered, to form one piece. The screw thread connection between them permits the fittings 40, 41 to be adjusted in length at the time the bellows is assembled. The hole through the bushing 33 connects the interior of the top wafer 31 with that of the bottom wafer 32, and the bushing itself spaces the wafers apart slightly, as shown. An annular pad 43 of sponge rubber is interposed between the wafers 31, 32 and is preferably, although not necessarily, cemented or otherwise bonded to adjacent spaces thereof to damp any relative movement between them, such as might be caused by vibration.

The bottom end of the pressure sentitive element 25 is free to move in response to variation in the pressure differential between the inside and outside of the element, and is operatively connected to the contact arm 26 through medium of a link member 44. The link 44 is in the form of a flat strip of metal having a horizontally bent portion at its top end, which is apertured to receive the threaded stem of a screw 45. The locknuts 46 secure the link to the screw, and also clamp a bellows-stabilizing diaphragm member 50 against a shoulder of the screw. The screw 45 extends through a hole in the bottom side of the bellows wafer 32 and is soldered thereto.

The diaphragm 50 is for the purpose of stabilizing the movable end of the bellows unit against side sway, and as shown in Figure 3, comprises a circular disc having a central hub portion 51 which is connected by generally radial spokes 52 to a rim 53. Downwardly bent ears 54 on opposite sides of the rim 53 are secured by screws 55 to the side arms of the support 35. The spokes 52 may be straight and radial, but are preferably of spiral configuration as shown in Figure 3, which affords the maximum resiliency for up and down movement of the screw 45 with a minimum of resistance to such deflection.

The bottom end of the strip 44 has an aperture in the form of a key hole slot 56 provided therein, which fits over and engages the annular channel 60 of a plastic spool member 61. The spool member 61 is provided with a central bore 62, and is rotatably supported on the end of a shaft 63 projecting from a pivot shaft 64. The pivot shaft 64 is pivotally supported between two bearings 65 that are mounted in laterally spaced, upwardly projecting bosses 66 that are molded integrally with the lid 18. The screw shaft 63 extends through a tapped hole in the pivot shaft 64, and projects radially therefrom. A counterweight 70 is threaded onto the end of the shaft 63 opposite the spool 61.

The purpose of the spool 61 is two fold: first, it insulates the bellows and link 44 from the contact arm 26; and second, it provides an adjustable moment arm through which the thrust of the bellows unit 31 is applied to the pivot shaft 64. Adjustment of the moment arm is obtained by turning the shaft 64 one way or the other through the tapped hole in the pivot shaft 64. The counterweight 70 is adjusted by screwing it one way or the other along the threaded shaft 63. The contact arm 26 is rigidly attached to the pivot shaft 64, and fixed to its outer end is a contact point 71 which wipes on one edge of the resistance element 30.

The resistance element 30 is preferably in the form of a wire-wound card, which is inserted into an arcuate slot 72 formed in an upwardly projecting boss 73 that is molded integrally with the lid 18. The element 30 is cemented in place in the boss 73, and the end of the wire windings are connected to terminals 74 and 75, which are molded into the lid 18. A third terminal 76 is connected to the contact arm 26 by means of a torsion spring 80, which is attached to the pivot shaft 64.

When the instrument is used as an absolute pressure potentiometer, the bellows unit 25 is exhausted to a high vacuum, and pressure is admitted to the cavity 17 through a tube fitting 81 which is screwed into a tapped hole 82 in the bottom end of the housing 16. Instruments of this type are often used to measure pressure such as 0 to 15 p.s.i.a.; the bellows unit 25 being fully extended when the pressure within the cavity 17 is 0 p.s.i.a., and being fully compressed when the pressure is 15 p.s.i.a. When the bellows is fully extended, the link 44 is pushed downwardly to its fullest extent and the contact 71 is at the bottom end of the resistance element 30. When the bellows is fully compressed, the link 44 is raised to its uppermost position, and the contact 71 is at the top end of the resistance element.

The two screws 36, 45 and the adjustable center bushing 33 function as limit stops to limit the compression of the bellows wafers when the external pressure exceeds a predetermined level. When it is desired to provide the bellows unit with a non-linear response, one of the wafers may be made less resistant to compression than the other, so that it closes against its limit stops before the other one. In the illustrated embodiment, the bottom wafer 32 is made thinner than the top wafer, or it may be made of lighter gauge sheet metal. Thus, at some predetermined pressure between the limits of the instrument's range, the bottom screw 45 abuts against the center bushing 33, as shown in Figure 6, so that the wafer becomes inoperative at higher pressures. At pressures below the aforesaid predetermined level, the two wafers 31, 32 expand and contract in unison, giving a relatively large travel for each increment of pressure change. At pressures above the said predetermined level, only the top bellows 31 is operative, and being stiffer than the bottom bellows 32, gives a response that is relatively smaller per increment of pressure change. When the pressure within the cavity 17 exceeds the maximum pressure for which the instrument is designed, the center bushing 33 abuts against the top screw 34, as in Figure 7, and the bellows is prevented from being further compressed.

Another form of the internal bellows stops is shown in Figure 8, to which reference is now directed. In this instance, the top limit stop screw 85 includes a tubular stem 86, which extends down through the hole in the center bushing 33 and is engageable by the bottom limit stop screw 88. The tubular stem 86 is apertured at 89 to permit free flow of air from one wafer to the other, where the wafers are pressurized. If all air has been evacuated from the bellows, there is no problem of circulation, and the holes 89 could be dispensed with. The limit stop arrangement of Figure 8 provides a one-stop limiting action to the compression of the bellows, and the two wafers would be identical in characteristic. As the pressure within the cavity reaches the predetermined maximum level, the end of the stem 86 abuts against the screw 88, preventing further compression of the bellows unit. This prevents the bellows from being damaged by excessive pressure.

A second feature of the embodiment illustrated in Figure 8 that differs from the preceding embodiment is the dynamic vibration absorber 90, which is attached to the bottom end of the bellows. The vibration absorber 90 comprises a thin diaphragm of resilient sheet metal having a hub portion 91 which is connected by radial spokes 92 to an outer rim 93. Downwardly bent ears 94 at opposite sides of the rim 93 are secured by screws 95 to the side arms of the support 35. Projecting radially from the hub 91 between the spokes 92 are arms 96, which carry weights 100 at their outer ends. The hub 91 is apertured to receive the stem of screw 88, and is clamped against a shoulder on the screw by locknuts 102. The arms 96 and weights 100 form a spring-mass system which vibrates in such a manner as to neutralize the forces acting upon the bellows. This is accomplished by tuning the spring-mass system 96, 100 to the major resonance frequency of the bellows assembly. Thus, the bellows assembly remains stationary, while the arms 96 and weights 100 do all the vibrating when a driving effort frequency equal to the resonant frequency of the bellows is applied.

Another embodiment of the invention is illustrated in Figure 10, wherein the limit stop arrangement is designed to limit expansion of the bottom bellows wafer 32'. In this form of the invention, the bottom limit stop member 45' has an upwardly projecting stem 130 provided thereon, which extends through the center bushing 33' and is threaded at its upper end to receive a nut 131. The nut 131 is larger than the hole in the bushing 33', and thus engages the bushing when the bottom bellows wafer 32' reaches a predetermined amount of extension. The exact point of engagement of the limit stop nut 131 with the bushing 33' can be adjusted by turning the nut 131 one way or the other along the threaded end portion of the stem 130.

Another feature of this embodiment is the auxiliary spring 132, which bears against the bottom end of the bellows. The spring 132 bears downwardly against a rigid plate 133 which is secured by screws 134 to the side arms of the support member 35'. The plate 133 is apertured at 135 to pass the link member 44'. The top end of the spring 132 is seated in a cup 136, which is formed integrally with the limit stop member 45'. The spring 132 is relatively stiff compared to the bellows, and its spring constant is so much greater than that of the bellows that the spring constant of the bellows becomes a negligible factor. This results in low hysteresis and good linearity of response, and permits easy adjustment of the travel versus pressure characteristics of the bellows by substitution of a spring of greater or lesser spring constant.

Another embodiment of the contact arm and connecting linkage is illustrated in Figures 11, 12, and 13. In this form of the invention, the contact arm comprises a thin, resilient strip 105 of metal which is attached at one end by a screw 106 to a post 110. The post 110 is embedded in the plastic lid 18 and its outer end 111 serves as the terminal for the contact arm. The strip 105 is formed of spring metal, such as beryllium copper, and is provided with a flat portion 107 adjacent the post 110, which is disposed in the plane perpendicular to the plane of movement of the contact 71'. The flat portion 107 is apertured at 108 to reduce the cross sectional area of the strip, so that bending of the strip is localized in that one area.

Beyond the flat portion 107, the edges of the strip 105 are bent up to form coverging sides 109, which stiffen the outer end of the strip against bending. An end flange 112 is bent up and soldered to the ends of the side flanges 109, and soldered to the end flange 112 is a vertical strip 113, to which the contact 71' is attached.

A bent wire member 115 is slidably mounted on the contact arm 105, and as best shown in Figure 14, is provided with a transverse portion 116, and rearwardly bent portions 117, which are seated in the corners formed at the junction of the side flanges 109 with the strip 105. The wire member 115 can be adjusted to any position along the length of the strip 105, and is then soldered in place.

The contact arm 105 is connected to the bellows by means of a link 118, which may be in the form of a wire having a loop 120 formed in the bottom end thereof. Rotatably mounted within the loop 120 is a plastic spool-shaped member 122 having two pins 123 projecting from one side thereof. The pins 123 are spaced apart radially on the spool member 122, and pass on either side of the transverse wire portion 116. The purpose of this arrangement is to provide a connection having no clearance or backlash, and this zero clearance condition is obtained by turning the member 122 so as to clamp the wire portion 116 lightly between the opposing pins 123. When this condition is obtained, the spool member 122 may be soldered to the loop 120. The pins 123 are free to turn about the cylindrical surface of the wire portion 116, and therefore exert no restraining action on the flexing of the contact arm 105. Vertical movement of the link 118 causes the strip 105 to bend in the flat, reduced-area portion 107, giving a swinging, relatively arcuate travel of the contact 71', approximating the action of a pivoted arm. The advantage of this arrangement is that it eliminates expensive pivots, which are also the source of some trouble.

It is believed that the operation and advantageous features of our invention will be apparent from the drawings and from the foregoing description. While we have shown and described in detail what we believe to be the preferred form of our invention, it will be understood that various changes may be made in the shape and

We claim:

1. A pressure sensitive element comprising a support, a bellows attached at one end to said support, the other end of said bellows being movable in response to variations in pressure applied thereto, and a dynamic vibration absorber attached to said other end of said bellows, said vibration absorber comprising a resilient member having arms projecting radially from the axis of said bellows, and weights attached to the outer ends of said arms, said vibration absorber being tuned to the major resonance frequency of said bellows, whereby said weights vibrate when a driving frequency equal to the resonant frequency of the bellows is applied, while said bellows remains substantially stationary.

2. In a pressure responsive instrument a pressure sensitive element having a portion movable in response to pressure changes, a resistance element, an arm attached at one end to a support and having a contact at the other end wiping on said resistance element, a rod fixed to said arm intermediate its ends, said rod being perpendicular to the plane of movement of said contact, a link attached at one end to said movable portion of said pressure sensitive element, and a member rotatably secured in the other end of said link, said member having a pair of radially spaced pins projecting from one end thereof, said pins passing on opposite sides of said rod, said member being turned to clamp said rod between said pins, and being then secured against rotation with respect to said link.

3. In a variable resistor, a body, a resistance element, a spring strip attached to said body, a contact on said strip wiping on said resistance element, said spring strip having a resilient portion adjacent said point of attachment which is free to bend in the plane of movement of said contact, a wire member adjustably secured on said arm and movable along the length thereof, said wire member having a portion disposed perpendicular to the plane of movement of said contact, an operating member associated with said spring strip, a spool rotatably supported on said operating member and having a pair of radially spaced pins projecting from one end thereof, said pins passing on opposite sides of said portion of said wire member, and said spool being turned to clamp said wire member between said pins.

4. In a variable resistor, a body, a resistance element mounted on said body, a contact arm of resilient material attached at one end to said body and having a contact at the other end wiping on said resistance element, said contact arm including a flat portion of reduced cross section adjacent the point of attachment, said flat portion being disposed in a plane perpendicular to the plane of movement of said contact, said arm beyond said flat portion having upwardly converging sides, a wire member having a transverse portion extending from one edge of said arm to the other and base portions slidably disposed within the corners formed at the junction of said upwardly converging sides with said arm and extending lengthwise of said arm, and operating member in the form of a wire having a loop at the bottom end thereof, a spool rotatably held within said loop and having a pair of radially spaced pins projecting from one end thereof, said pins passing on opposite sides of said transverse portion of said wire member, and said spool being turned in said loop to clamp said wire member between said pins.

5. A pressure sensitive element comprising a support, elastic pressure responsive means mounted on said support and having one end thereof movable responsive to pressure changes, said pressure responsive means having a spring constant causing said one end to have at least one major resonant frequency of vibration, a weight, and resilient means connecting said weight to said one end of said pressure responsive means for oscillatory movement in the same general direction as the movement of said one end, said weight and said resilient means having a resonant frequency substantially the same as said major frequency of said one end, whereby said weight vibrates when a driving frequency equal to the resonant frequency of said one end is applied, while said one end remains substantially stationary.

6. A pressure sensitive element comprising a support, a bellows attached at one end to said support, the other end of said bellows being movable in response to variations in pressure applied thereto, and a dynamic vibration absorber attached to said other end of said bellows, said vibration absorber comprising a weight, and resilient means connecting said weight to said movable end of said bellows, said weight being supported for oscillatory movement with respect to said movable end of said bellows in the same general direction as the movement of said movable end, said weight and said resilient means having a resonant frequency substantially corresponding to the major resonant frequency of said bellows, whereby said weight vibrates when a driving frequency equal to the resonant frequency of the bellows is applied, while said movable end of said bellows remain stationary.

References Cited in the file of this patent

UNITED STATES PATENTS

| | | |
|---|---|---|
| 2,443,252 | Kelly | June 15, 1948 |
| 2,484,030 | Hastings et al. | Oct. 11, 1949 |
| 2,622,177 | Klose | Dec. 16, 1952 |
| 2,857,495 | Bourns et al. | Oct. 21, 1958 |